(12) United States Patent
Gonzalez et al.

(10) Patent No.: US 11,113,467 B2
(45) Date of Patent: Sep. 7, 2021

(54) PROCESSING OF 3D PRINTING FILES

(71) Applicant: HEWLETT-PACKARD DEVELOPMENT COMPANY, L.P., Houston, TX (US)

(72) Inventors: Sergio Gonzalez, Sant Cugat del Valles (ES); Jordi Gonzalez, Sant Cugat del Valles (ES); Sebastia Cortes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 199 days.

(21) Appl. No.: 16/095,495

(22) PCT Filed: May 12, 2016

(86) PCT No.: PCT/EP2016/000778
§ 371 (c)(1),
(2) Date: Oct. 22, 2018

(87) PCT Pub. No.: WO2017/194071
PCT Pub. Date: Nov. 16, 2017

(65) Prior Publication Data
US 2019/0095418 A1 Mar. 28, 2019

(51) Int. Cl.
*G06F 16/30* (2019.01)
*G06F 40/221* (2020.01)
(Continued)

(52) U.S. Cl.
CPC .......... *G06F 40/221* (2020.01); *B29C 64/386* (2017.08); *B33Y 50/00* (2014.12);
(Continued)

(58) Field of Classification Search
CPC .............................. G06F 40/221; G06F 40/258
(Continued)

(56) References Cited

U.S. PATENT DOCUMENTS

| 6,105,012 A | 8/2000 | Chang et al. |
| 8,316,358 B2 | 11/2012 | Chen et al. |

(Continued)

FOREIGN PATENT DOCUMENTS

WO WO-2014210394 12/2014

OTHER PUBLICATIONS

Wang, Fangju, et al., "A space efficient XML DOM parser", Data & Knowledge Engineering, vol. 60, Ussue 1, Abstract, Jan. 2007, 5 pages.
(Continued)

*Primary Examiner* — Sana A Al-Hashemi
(74) *Attorney, Agent, or Firm* — HP Inc. Patent Department

(57) ABSTRACT

A method is described in which a 3D printing file is processed, the 3D printing file having a header and including a plurality of compressed files. The method comprises reading a content of the header of the 3D printing file, identifying, based on the header content, a relation file among the plurality of compressed files, identifying, based on the relation file, a main 3D model file among the plurality of compressed files. Further the method comprises creating, by uncompressing the main 3D model file, a data stream, and analyzing, with a parser, the data stream, thereby directly processing the main 3D model file when being uncompressed.

15 Claims, 3 Drawing Sheets

(51) Int. Cl.
    *B29C 64/386* (2017.01)
    *B33Y 50/00* (2015.01)
    *G06K 15/02* (2006.01)
    *G06F 30/00* (2020.01)
    *G06F 40/258* (2020.01)
    *G06F 119/18* (2020.01)
    *B33Y 40/00* (2020.01)
    *B33Y 50/02* (2015.01)

(52) U.S. Cl.
    CPC ............ *G06F 30/00* (2020.01); *G06F 40/258* (2020.01); *G06K 15/1856* (2013.01); *B33Y 40/00* (2014.12); *B33Y 50/02* (2014.12); *G06F 2119/18* (2020.01); *Y02P 90/02* (2015.11)

(58) Field of Classification Search
    USPC ........ 707/609, 687, 705, 769, 790, 813, 821
    See application file for complete search history.

(56) References Cited

U.S. PATENT DOCUMENTS

| | | |
|---|---|---|
| 8,339,641 B2 | 12/2012 | Grams |
| 8,739,022 B2 | 5/2014 | Chiu et al. |
| 2002/0112164 A1 | 8/2002 | Schmeling et al. |
| 2011/0149339 A1* | 6/2011 | Chae ..................... G06F 3/1284 358/1.15 |
| 2013/0135123 A1* | 5/2013 | Golander ............ H03M 7/3086 341/65 |
| 2014/0089332 A1 | 3/2014 | Maharana et al. |
| 2015/0142152 A1* | 5/2015 | Rezayat ................ B29C 64/307 700/98 |
| 2015/0201500 A1* | 7/2015 | Shinar ................... B29C 64/135 425/132 |
| 2016/0098382 A1* | 4/2016 | Popov ................... G06F 40/197 715/229 |

OTHER PUBLICATIONS

International Search Report and Written Opinion for International Application No. PCT/EP2016/000778 dated Feb. 23, 2017, 15 pages.
"3D Manufacturing Format", Core Specification & Reference Guide, XP55344286, 2015, 49 pages.
"Office Open XML Part 2: Open Packaging Conventions", XP55344328, Oct. 2006, 128 pages.

* cited by examiner

| Name | Size | Packed Size |
|---|---|---|
| 3D | 13 557 | 5 953 |
| Metadata | 4 309 | 3 989 |
| _rels | 420 | 221 |
| [Content_Types].xml | 801 | 279 |

Fig. 3

| Name | Size | Packed Size |
|---|---|---|
| .rels | 420 | 221 |

Fig. 4

| Name | Size | Packed Size |
|---|---|---|
| Texture | 9 826 | 4 808 |
| _rels | 383 | 202 |
| 3dmodel.model | 3 348 | 943 |

Fig. 5

| Name | Size | Packed Size |
|---|---|---|
| thumbnail.png | 4 309 | 3 989 |

Fig. 6

PROCESSING OF 3D PRINTING FILES

BACKGROUND

Additive manufacturing is a process of making three-dimensional objects from a 3D printing file representing a digital model. During this process, the 3D printing file may be unpacked and stored into a storage area and afterwards may be processed from the storage area.

BRIEF DESCRIPTION OF THE DRAWINGS

Examples will be described, by way of example only, with reference to the accompanying drawings in which corresponding reference numerals indicate corresponding parts and in which:

FIGS. 3-6 are illustrations of example folders/files.

DETAILED DESCRIPTION

Processing a 3D printing file by a 3D printer system, or additive manufacturing system, may depend, amongst other things, on the structure of the 3D printing file and the processing system used by the 3D printer system. When a 3D printing file is processed by the 3D printer system, the 3D printing file is processed in a pre-printing or pre-manufacturing process and a physical object is generated through an additive manufacturing process or 3D printing process. In particular, the performance of the pre-printing or pre-manufacturing process may be a time-consuming and disk space consuming. E.g. handling a 3D printing file may include storing its uncompressed content which may comprise a large amount of data, and afterwards processing the stored 3D printing file content.

Thus, a method is provided for processing a 3D printing file, the 3D printing file having a header and including a plurality of compressed files. In one example, the method comprises reading a content of the header of the 3D printing file, identifying, based on the header content, a relation file among the plurality of compressed files, identifying, based on the relation file, a main 3D model file among the plurality of compressed files, creating a data stream by uncompressing the main 3D model file, and analyzing, with a parser, the data stream, thereby directly processing the main 3D model file when being uncompressed. Further, a 3D printer system for applying the method and a computer-readable medium for storing a program causing a computer processor to perform the method is provided. Hence, by storing the compressed input 3D printing file and the processed content, storing the uncompressed residual content of the 3D printing file can be avoided which in turn may save processing time and disk space.

Figure 1:
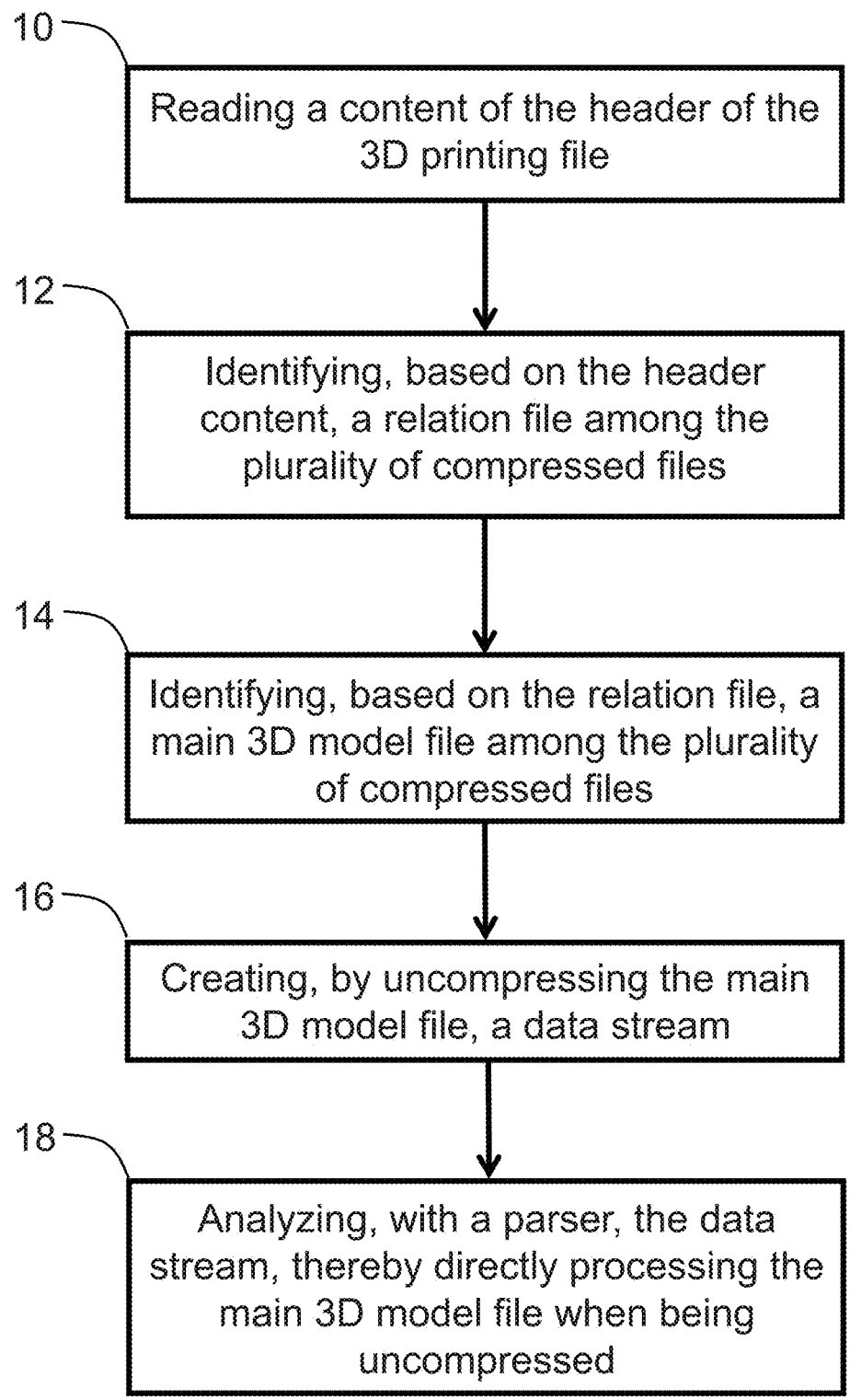
FIG. 1 is a block diagram of an example method for processing a 3D printing file according to an example.

FIG. 1 illustrates an example method for processing a 3D printing file. 3D printing, also known as additive manufacturing is a process of making a three-dimensional object of virtually any shape from a digital model defined in a certain format. The method for processing a 3D printing file including the digital 3D model may be implemented into any 3D printer or manufacturing device including common 3D printer techniques. A processor that may be external to a manufacturing device may also process the method for processing a 3D printing file. In some examples, the 3D printing file is processed by a 3D printer system comprising at least a 3D printer device and a processor or an additive manufacturing system comprising at least a manufacturing device and a processor.

3D printing or additive manufacturing comprises a group of technologies with a common characteristic of adding material to form an object, i.e. the object may be created by laying down successive layers of material until the entire object is created. A large number of materials (e.g. sand, cements, ceramics, textiles, biomaterials, glass, resins or plastics) may be used by some 3D printing technologies such as Stereolithography (SLA), Digital Light Processing (DLP), Continuous Liquid Interface Production (CLIP), Direct Metal Laser Sintering (DMLS), Selective Deposition Lamination, Fused Deposition Modeling (FDM) and Selective Laser Sintering (SLS). In general with regard to 3D printing, the term "material" is to be understood in the sense of a physical substance that can be used to generate an object.

Processing a 3D printing file may comprise pre-printing or pre-manufacturing processes, i.e. the 3D printer system may get the 3D printing file including the 3D model file ready for printing or manufacturing. Further, the 3D printing system may be capable to read and interpret the file structure of the 3D printing file. In some examples, processing may also comprise the actual additive manufacturing process of a physical 3D object, i.e. the 3D printing file is used by the 3D printer system to produce the 3D object. Processing a 3D printing file may also comprise modifying a 3D printing file, e.g. by amending parameters of a 3D model contained in the 3D printing file to be manufactured. The 3D model may be generated on a computer system external to the 3D printer. The 3D printing file may include a 3D model file representing the 3D model wherein the 3D printing file may have a specific file format suitable for 3D printing or additive manufacturing systems. The 3D printing file may have a variety of file formats.

In some examples, the format of the 3D printing file including the plurality of compressed files is based on an Open Packaging Conventions standard. The Open Packaging Conventions standard is a specification that describes a packaging model, i.e. how the package (e.g. the 3D printing file) is represented with parts and relationships. Such a packaging model may store XML and non-XML files that form together e.g. an Open XML Paper Specification. In some examples, the 3D printing file is an Open XML document. I.e., it may be a compressed file that contains XML, binary and other types of files. According to the Open Packaging Conventions, the 3D printing file may be defined as a document having a set of XML files (document parts). Further, relationships may be defined between the document parts. In some examples, the format of the 3D printing file is based on the Open Packaging Conventions, i.e. this standard defines how the 3D printing file is structured, e.g. when realized as a compressed file package.

In some examples, the 3D printing file has a format that is based on the 3D Manufacturing Format standard. The 3D Manufacturing Format or 3D document format standard (3MF) may define one or more 3D objects intended for output to a physical form by a 3D printer system. 3MF implements the common package features specified by the Open Packaging Conventions specification. I.e., the 3D printing file having the 3MF format may follow the Open Packaging Conventions. The 3D printing file having the 3MF format may represent a 3D model. Thus, a 3D printing file that implements the 3MF format includes information on how to generate a physical object through additive manufacturing techniques. 3MF may be used as a stand-alone file format or as a payload in a print pipeline. The term "payload" is understood herein as a complete collection of interdependent parts and relationships within a 3D printing file. The 3D printing file having the 3MF format may represent a 3D model in a markup format, i.e. 3MF may be an XML-based markup language that uses e.g. elements, attributes and namespaces. 3MF is designed to include a set of parts and relationships. 3MF also extends the package features specified by the Open Packaging Conventions specification, including digital signatures and thumbnails. For additional details of the 3MF, see under "3D Manufacturing Format—Core Specification & Reference Guide (Version 1.1); Copyright 3MF Consortium 2015".

In some examples, the 3D printing file includes a plurality of compressed files. The term "compressed files" may be understood herein as a plurality of files within a compressed file package. The plurality of compressed files may be arranged in a random manner within the 3D printing file. In some examples the plurality of compressed files is based on the Open Packaging Conventions standard and comprises files having an XML format or any other format according to the Open Packaging Conventions. In some examples, the 3D printing file also includes non-compressed files. The compressed files may comprise document parts and relationships between the document parts. I.e. the 3D printing file may include document parts, e.g. XML files that make up the contents of the file and the relationships that describe how the document parts work together.

In some examples, the 3D printing file has a header. Generally, a header or header file may be a text file or text portion of a file including declarations and other parts of the source code of the 3D printing file including the plurality of compressed files. The 3D printing file may also include a plurality of headers. In some examples, the 3D printing file is compressed, e.g. according to a ZIP file format. In the latter case, the header(s) of the 3D printing file may be a ZIP header(s). In some examples, the header of the 3D printing file comprises information of the plurality of compressed files such as the file name, the size and the position (e.g. starting position) within the compressed files of the 3D printing file, i.e. the header may provide information about the files included in the 3D printing file. The header of a file may include any information about the file or about a plurality of files, such as the source code structure of a 3D printing file. The plurality of compressed files contained in the 3D printing file may have a position included in a header. The position may locate the compressed file within the 3D printing file.

The example method of processing a 3D printing file includes reading, in block 10, a content of the header of the 3D printing file. Before reading, the 3D printing file may be provided to the 3D printer of the 3D printer system and therefore serving as an input file. In some examples, the input file is stored on a disk or a storage in the 3D printer. In some examples, the 3D printer may include a processor or a firmware for processing the input file. The 3D printing file may be received from a data processing system, by loading from storage. It may also be received from another device. In some examples, when the 3D printing file is a ZIP file, reading the content of the header of the 3D printing file may comprise loading the ZIP file content from the 3D printing file ZIP header. In some examples, the 3D printing file which may be of the 3MF document format is a ZIP file that may contain a compressed 3D model file as well as further files. In some examples, reading the content of the header of the 3D printing file comprises storing the information of the header content of the plurality of compressed files included in the 3D printing file. The header content may also be stored partially, i.e. the header information that has no use during processing of the 3D printing file is not stored on memory.

Further, in block 12, a relation file is identified based on the header content among the plurality of compressed files. In some examples, the relation file may be an Open Packaging Conventions relationship file according to the Open Packaging Conventions standard. According to the Open Packaging Conventions, the plurality of compressed files may include document parts and relationships between the document parts. I.e. the 3D printing file may include document parts, e.g. XML files that may make up the contents of the file, and relationships that may be e.g. contained in the relation file, that describe how the document parts work together. In some examples, the relation file points to a set of initial document parts, such as the 3D model. The relation file may be defined to identify the root (e.g. the 3D model part) of a 3D payload within the 3D printing file. In some examples, the relation file may point to the 3D model part that identifies the root of the 3D payload. The payload includes the full set of parts (e.g. thumbnail and 3D texture) for processing the 3D model. For more information on document parts and relationships, see the Open Packaging Conventions specification (e.g. ECMA 376-2 and ISO/IEC 29500-2).

In block 14, the example method further comprises identifying, based on the relation file, a main 3D model file among the plurality of compressed files. The relation file may include a pointer to the main 3D model file. In some examples, identifying may include finding a primary 3D payload in a package (e.g. the 3D model file). The main 3D model file is part of the compressed files and may refer to an object to be created. In some examples, the main 3D model file refers to a plurality of objects to be created via 3D manufacturing processes as a single operation. In some examples, the main 3D model file is of the 3MF Document format. In some examples, the main 3D model file is of an XML format. In some examples, identifying the main 3D model file among the plurality of compressed files comprises parsing the Open Packaging Conventions relationship file with a parser. Any parser may be used for parsing the relationship file. The parser or processor is a software component that takes input data, such as the 3D printing file, analyzes the data and finally provides information contained therein to an application. In some examples, the parser is an XML parser. An XML parser may analyze an XML file and provides the XML file's information to the application. In some examples, the parser is an XML streamed parser that handles an XML stream including a plurality of XML files. In some examples, the XML parser parses the relation file which may be of an XML format, thereby identifying the main 3D model file. In some examples, the procedure of identifying the main 3D model file includes processing the relation file which has been identified in a certain folder. The relation file may include relationships referring to a 3D model file. In some examples, the relationships also refer to a thumbnail. The thumbnail may be a document part of the 3D printing file containing an image (e.g. in a JPEG or PNG format) that represents the 3D object to be printed. In some examples, identifying the main 3D model file comprises following the link or pointer included in the relation file to the main 3D model file. In some examples, the main 3D model file may be located in a folder including further information on the texture with regard to the 3D model.

According to the example method, in block 16, by uncompressing the main 3D model file among the plurality of compressed files a data stream is created. Creating the data stream may include creating an extraction stream. Further, based on the extraction stream, the compressed 3D model file will be read from the 3D printing file, and a decompression algorithm will be used to uncompress the compressed 3D model file. The data stream may be an XML stream including a plurality of XML files which may be used as input to an XML streamed parser. According to the Open Packaging Conventions, the document part such as the main 3D model file is retrieved by using streams. In some examples, uncompressing the main 3D model file is based on a deflate algorithm. In some examples, uncompressing the main 3D model file is based on the RFC 1951 standard that is adapted to the Open Packaging Conventions standard. The RFC 1951 algorithm may be the only compression algorithm allowed by the Open Packaging Conventions.

In block 18, the data stream is analyzed with a parser, thereby directly processing the main 3D model file when being uncompressed. I.e., the parser may process the 3D model file as soon as it is unpacked thereby avoiding to write the uncompressed 3D model file on memory. In some examples, the method further comprises making available the processed structures for a 3D printer of the 3D printer system. In some examples, analyzing the data stream may include to store the processed structures of the 3D model file, i.e. storing the uncompressed content of the 3D printing file may be avoided. In some examples, the processed structures are processed further by the firmware of the 3D printer. In some examples, the parser may process the data stream as soon as it is unpacked. In some examples, analyzing, with a parser, the data stream includes reading the data stream of the 3D model file thereby avoiding a read operation of the whole content of the 3D printing file. In some examples, traversing the data stream takes place immediately when the 3D model file has been uncompressed.

In some examples, the main 3D model file may have references to further model files to parallelize the parsing by creating parsing streams in separated execution threads. In some examples, parallelizing may be possible when the 3D printing file is of the 3MF format.

In a concrete example of the method disclosed herein, the 3D printing file may be of a 3MF package structure, i.e. the 3D printing file may be structured according to the example 3MF root structure shown in FIG. 3.

The 3D printing file may include a plurality of compressed files, wherein the compressed files may be located in several folders, such as a 3D/ folder, a Metadata/ folder and a _rels/ folder. The 3MF root structure may also include a [Content_Types].xml file. After having read the header content of the 3D printing file (block 10), the relation file (".rels") that is located in the _rels/ folder is identified among the plurality of compressed files (block 12) (see FIG. 4). Based on the relation file (".rels") which may include the following excerpt of an example code with regard to relationships, a main 3D model file ("3dmodel.model") is identified:

```
<?xml version="1.0" encoding="UTF-8"?>
<Relationships xmlns = http://schemas.openxmlformats.org/package/2006/relationships">
<Relationship Id="rel0" Target="/3D/3dmodel.model"
Type=http://schemas.microsoft.com/3dmanufacturing/2013/01/3dmodel/>
<Relationship Id="rel1" Target="/Metadata/thumbnail.png"
Type="http://schemas.openxmlformats.org/package/2006/relationships/metadata/thumbnail>
</Relationships>
...
```

By following the link /3D/3dmodel.model contained in the relation file pointing to the main 3D model file, the main 3D model file may be identified (block 14). To this effect, the parser may parse the text string "3D model.model" contained in the relation file. When having identified the text string, this will be used as the link to the main 3D model file. In addition to the 3dmodel.model file, the 3D/ folder may further include a Texture/ folder and a _rels/ folder (see FIG. 5). The relation file (".rels") may also include a relationship that points to the thumbnail file located in /Metadata/thumbnail.png, as shown in FIG. 6. Further, the main 3D model file ("3dmodel.model") will be uncompressed and analyzed with a parser, thereby directly processing the main 3D model file when being uncompressed (blocks 16 and 18).

Figure 2:
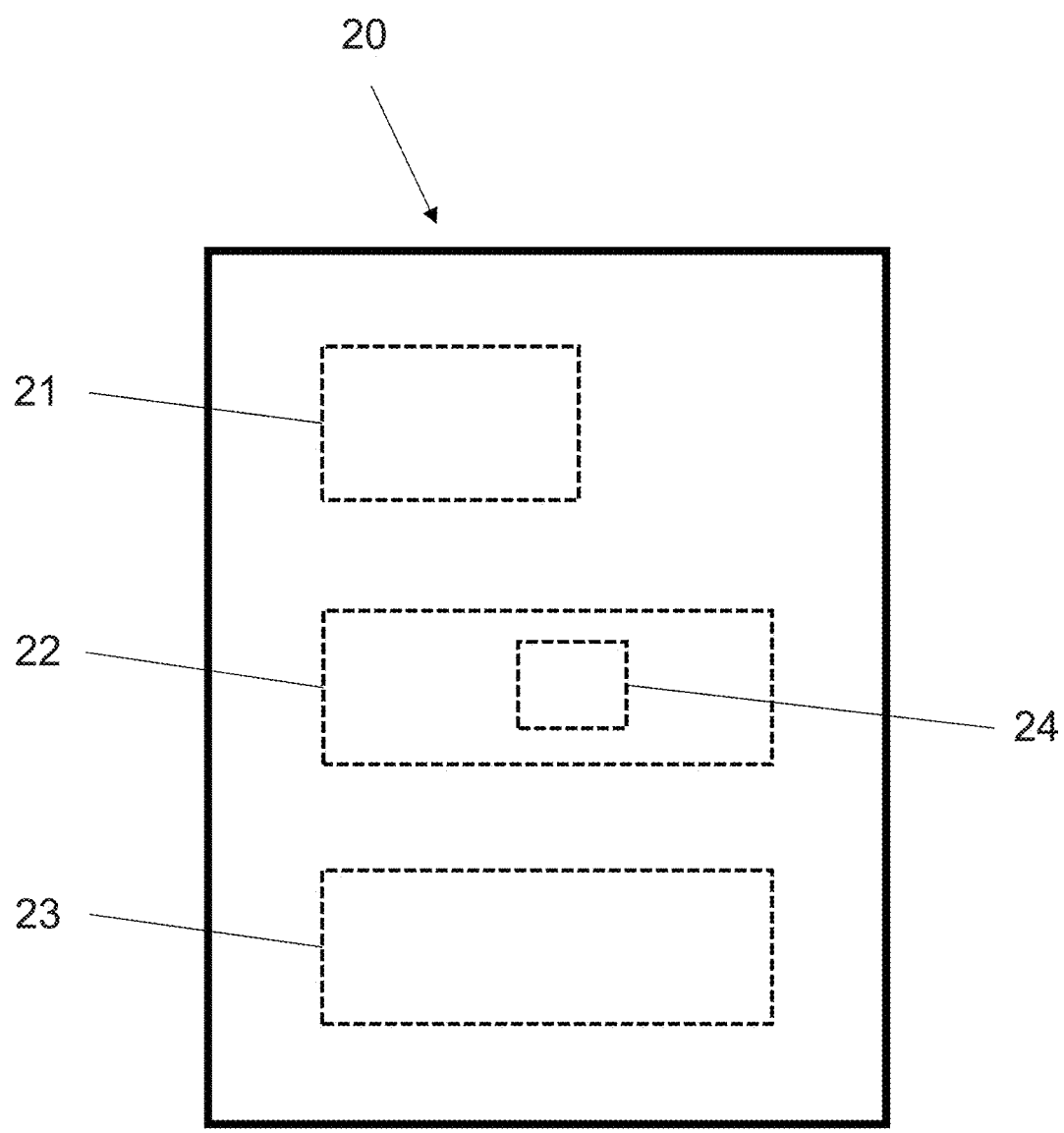
FIG. 2 is a block diagram of an example 3D printer system.

Now referring to FIG. 2, which illustrates a block diagram of an example 3D printer system 20 comprising a processor 21, a machine-readable storage medium 22 and a print mechanism 23. The print mechanism 23 may be part of a 3D printer. The storage medium 22 includes, among other data and programs, an input file 24 (e.g. the 3D printing file that represents a ZIP package). The 3D printer system 20 may be particularly configured to perform the processes described herein. In some examples, the processor 21 may perform the input file 24 being stored in the storage medium 22, wherein the input file 24 includes the example method for processing a 3D printing file by the 3D printer system 20, according to the example method described in FIG. 1. In some examples, the 3D printer system 20 may be controlled by a personal computer that also may include a processor and a storage. Communication between the personal computer and the 3D printer system 20 may be established through a network connection.

Machine-readable storage medium 22 may be any electronic, magnetic, optical, or other physical storage device that stores executable instructions. Thus, machine-readable storage medium 22 may be, for example, Random Access Memory (RAM), an Electrically-Erasable Programmable Read-Only Memory (EEPROM), Flash Memory, a storage drive, an optical disc, and the like.

While several examples have been described in detail, it is to be understood that the disclosed examples may be modified. Therefore, the foregoing description is to be considered non-limiting.

What is claimed is:

1. A method for processing a 3D printing file, comprising:
receiving a 3D printing file comprising a header and a plurality of compressed files;
reading a content of the header of the 3D printing file;
based on the header content, identifying among the plurality of compressed files, a relation file that points to a main 3D model file representing a plurality of objects to be created via a 3D manufacturing process;
based on the relation file, identifying the main 3D model file among the plurality of compressed files;
creating, by uncompressing the main 3D model file, a data stream; and
analyzing, with a parser, the data stream, thereby directly processing the main 3D model file when being uncompressed.

2. The method according to claim 1, wherein the format of the 3D printing file including the plurality of compressed files is based on an Open Packaging Conventions standard.

3. The method according to claim 2, wherein the plurality of compressed files based on the Open Packaging Conventions standard comprises files having an XML format or any other format according to the Open Packaging Conventions.

4. The method according to claim 1, wherein the 3D printing file is compressed according to a ZIP file format.

5. The method according to claim 1, wherein the relation file is an Open Packaging Conventions relationship file according to the Open Packaging Conventions standard.

6. The method according to claim 5, wherein based on the relation file, identifying the main 3D model file among the plurality of compressed files comprises, parsing the Open Packaging Conventions relationship file with a parser.

7. The method according to claim 1, wherein uncompressing the main 3D model file is based on a deflate algorithm.

8. The method according to claim 2, wherein uncompressing the main 3D model file is based on the RFC 1951 standard which is adapted to the Open Packaging Conventions standard.

9. The method according to claim 1, wherein the 3D printing file has a format that is based on the 3D Manufacturing Format standard.

10. The method according to claim 3, wherein the parser is an XML parser.

11. The method according to claim 1, wherein the main 3D model file has references to further model files to parallelize the parsing by creating parsing streams in separated execution threads.

12. The method according to claim 1, wherein the header of the 3D printing file comprises information of the plurality of compressed files such as the file name, the size and the position within the compressed files of the 3D printing file.

13. The method according to claim 1, wherein the 3D printing file is processed by a 3D printer system.

14. A 3D printer system, comprising:
a processor;
wherein the processor is to process a 3D printing file having a header and including a plurality of compressed files, processing comprises to:
read the content of the header of the 3D printing file;
identify, based on the header content, a relation file among the plurality of compressed files that points to a main 3D model file representing a plurality of objects to be created via a 3D manufacturing process;
identify, based on the relation file, the main 3D model file among the plurality of compressed files;
create, by uncompressing the main 3D model file, a data stream; and
analyze, with a parser, the data stream, thereby directly processing the main 3D model file when being uncompressed.

15. A non-transitory computer readable medium for storing a program causing a computer processor to perform a method for processing a 3D printing file, the 3D printing file having a header and including a plurality of compressed files, the non-transitory computer readable medium comprising:
instructions to read the content of the header of the 3D printing file;
instructions to identify, based on the header content, a relation file among the plurality of compressed files that points to a main 3D model file representing a plurality of objects to be created via a 3D manufacturing process;
instructions to identify, based on the relation file, the main 3D model file among the plurality of compressed files;
instructions to create, by uncompressing the main 3D model file, a data stream; and instructions for a parser to analyze the data stream, thereby directly processing the main 3D model file when being uncompressed.

* * * * *